United States Patent [19]
Miura et al.

[11] Patent Number: 5,913,402
[45] Date of Patent: Jun. 22, 1999

[54] PARTS ALIGNMENT DEVICE

[75] Inventors: Masaaki Miura; Kouji Sakota, both of Hiroshima, Japan

[73] Assignee: Seki Kogyo Co., Ltd., Hiroshima, Japan

[21] Appl. No.: 08/960,231

[22] Filed: Oct. 29, 1997

[30] Foreign Application Priority Data

Aug. 7, 1997 [JP] Japan .................................. 9-213194

[51] Int. Cl.$^6$ .................................................. B65G 17/46
[52] U.S. Cl. ......................................................... 198/690.1
[58] Field of Search ................................ 198/619, 690.1, 198/381, 396, 443, 377.05, 377.09

[56] References Cited

U.S. PATENT DOCUMENTS

| | | | |
|---|---|---|---|
| 2,862,601 | 12/1958 | Littwin et al. | 198/690.1 X |
| 2,863,588 | 12/1958 | Stover | 198/690.1 X |
| 3,430,752 | 3/1969 | Spodig | 198/690.1 X |
| 3,754,313 | 8/1973 | McCulloch | 198/381 |

FOREIGN PATENT DOCUMENTS

| | | |
|---|---|---|
| 2833424 | 2/1980 | Germany . |
| 53-145264 | 12/1978 | Japan . |
| 62-14010 | 4/1987 | Japan . |
| 62-157117 | 7/1987 | Japan . |
| 63-180620 | 11/1988 | Japan . |
| 64-6952 | 2/1989 | Japan . |
| 7-25438 | 1/1995 | Japan . |
| 1 141 571 | 1/1969 | United Kingdom . |

*Primary Examiner*—James R. Bidwell
*Attorney, Agent, or Firm*—Sixbey, Friedman, Leedom & Ferguson, PC; Eric J. Robinson

[57] ABSTRACT

The sorting and alignment of welding nuts are conducted with stability regardless of a variation in number with lower noise. A charging chute is provided on its end of obliquely downward slope with a nut-sorting part, and a face plate facing obliquely upward is disposed in a tilted position so as to define the nut-storing part. The face plate is formed with stainless steel of non-magnetic material. A permanent magnet is provided on the back of the face plate so as to move on a specific rotational locus, and moved in rotation by a motor. A posture shift guide is disposed on the front face of the face plate and a specific circumference corresponding to the specific locus to shift welding nuts attracted by the permanent magnet into their lying postures. Out of the welding nuts in their lying postures, the ones with their base in opposition to the face plate are flipped by a regulating block to be dropped in the nut-storing part, while only the ones with their top face in opposition to the face plate are allowed to pass into an alignment and feed guide, after which they are sequentially stored in aligned positions in an alignment and feed guide to be fed to a nut feeding equipment.

9 Claims, 13 Drawing Sheets

PARTS ALIGNMENT DEVICE

BACKGROUND OF THE INVENTION

The present invention relates to a parts alignment device for use in sorting the top faces from the bases of a large number of parts stored randomly to align the parts each in a unified posture in automatically feeding parts such as welding nuts to automatic welding equipment and the like.

Conventionally, as this kind of parts alignment device, there have been known devices whereby sorting is conducted by the use of centrifugal force (See, ex., Japanese Laid-open Patent Publication No. 62-157117), and devices whereby sorting is conducted by the use of circumferential vibration (See, ex., Japanese Utility Model Publication No. 64-6952, and Japanese Laid-open Patent Publication No. 7-25438).

However, the aforementioned conventional parts alignment devices, especially, the devices employing vibration have disadvantages in that they tend to make a source of noise, and that a small amount of parts in a storing part causes too much vibration acting on the parts, while a large amount of parts causes too little acting vibration, which impedes stable sorting and alignment.

The present invention has been achieved in view of the foregoing. It is therefore an object of the present invention to provide a parts alignment device capable of conducting stable sorting and alignment regardless of a variation in number of parts in a storing part with low noise.

SUMMARY OF THE INVENTION

To attain the above object, a parts alignment device according to the present invention includes a face plate formed with a non-magnetic material or feeble magnetic material. The face plate is provided with, closer to one of either the front or back thereof, an attraction means for moving in rotation along a specific rotational locus about a central axis orthogonal to the face plate to cause a magnetic field to act toward the other side of the face plate, and a rotational drive means for rotating the attraction means about the central axis. In addition, the face plate is provided with, closer to the other side thereof, sequentially in the direction of rotation of the attraction means along a specific circumference corresponding to the specific rotational locus of the attraction means across the face plate, a tube-like posture shift guide for shifting a part attracted by the attraction means into the posture in which either of the top face or base thereof is opposed to the face plate in accordance with the rotational movement of the attraction means, and a top-base sorting means for permitting the passage of parts each with its top face in opposition to the face plate, while flipping parts each with its base in opposition to the face plate against the force of attraction due to the magnetic field to reject the passage thereof depending on the difference in projection thickness from the face plate when the parts are attracted with the top faces or bases in opposition to the face plate.

In the above invention, the rotational driving of the attraction means about a central axis by the rotational drive means causes the magnetic field due to the attraction means to move in rotation along the specific circumference on the other side of the face plate. Accordingly, if a large number of parts are stored in a certain area on the specific circumference, some parts in the certain area under the influence of the magnetic field are attracted out of the large number of parts. Then, the attracted parts slide on the face plate to move in rotation along the specific circumference in accordance with the rotational movement of the attraction means. First, the attracted parts enter the posture shift guide, and then, the parts are shifted in posture so that either of the top faces or bases thereof are opposed to the other side of the face plate. Then, among the attracted parts, the parts in their postures in which their bases are opposed to the face plate are flipped, while only the parts in their postures in which their top faces are opposed to the face plate are allowed to pass by the top-base sorting means. These steps are repeated by the rotational movement of the attraction means, which permits all of the large number of parts to be sequentially aligned each in a unified posture in which its top face is opposed to the face plate. In the above steps of sorting the top face from bases and alignment, the present invention employs the attraction action due to the magnetic field of the attraction means, and hence sorting and alignment of all the parts can be conducted regardless of a variation in number of the above stored parts with reliability. Further, lower noise can be implemented as compared with conventional devices whereby all the parts are shaken with vibration.

Therefore, according to the parts alignment device of the present inventions all of the large number of parts can be sequentially aligned each in a unified posture in which its top face is opposed to the face plate. Further, in the step of sorting the top faces from the bases and alignment, sorting and alignment of all the parts can be conducted regardless of a variation in number of the parts with reliability. In addition, as compared with conventional devices whereby all the parts are shaken by vibration, lower noise can be implemented.

In the present invention, as shown in each case below, various kinds of components may be specified as each of the above components, and various kinds of other components may be added.

As the first case, a storage tube for storing the parts which have passed the top-base sorting means in their aligned positions may be added. This enables the parts whose top faces have been sorted from the bases by the top-base sorting means to be stored in the storage tube in their aligned positions one by one.

As the second case, the face plate according to the present invention may be disposed in a tilted position with the other side facing upward toward the diagonal direction, and the top-base sorting means is positioned in the neighborhood of the upper end portion of the face plate, while a parts-storing part capable of storing a plurality of parts in their nonaligned positions is formed in the neighborhood of the lower end portion of the other side of the face plate. In this second case, the face plate is disposed in a tilted position, and hence the parts flipped and rejected by the top-base sorting means is caused to slide down on the face plate by the action of gravity to automatically return to the parts-storing part. Further, when the part is not in a prescribed posture which is attracted by the attraction means from the parts-storing part and caused to move in rotation toward the posture shift guide, it is flipped and dropped at the inlet of the posture shift guide to automatically return to the parts-storing part. In this way, without providing a specific means for returning the parts flipped and rejected by the top-base sorting means or the like to the parts-storing part, the parts can be caused to return thereto.

As the third case, the parts-storing part in the above second case may be provided with an impulse imparting means for intermittently imparting an impulse on the plurality of parts. The impulse imparting means is so constructed as to include a tube-like portion with one end being positioned at the parts-storing part, and the other end arcuately extending in the opposite direction of the direction of rotation of the attraction means along the specific circumference, both the ends being closed, and a sphere being formed with a magnetic material, and being movably stored along the specific circumference inside the tube-like portion.

In this third case, when the attraction means moving in rotation approaches the other end of the tube-like portion, the sphere in the tube-like portion is drawn closer to the other end of the tube-like portion along the specific circumference to be attracted thereto. Then, the sphere in the attracted condition moves in rotation together with the attraction means to collide against the one end of the tube-like portion. On this collision, an impulse force acts on the one end of the tube-like portion, and the impulse force is transferred to the parts in the parts-storing part. Accordingly, whenever the attraction means rotates, the impulse force is intermittently transferred. Therefore, even if the parts in the parts-storing part fall in the condition where the parts act like a wedge, or the like, and temporarily leads to their crosslinked relationship to one another, the crosslinked relationship can be broken by the impulse force to allow the parts to be positioned along the specific circumference and to be attracted by the attraction means with reliability until a final part is reached. This assures that all the parts in the parts-storing part can be sorted and aligned with reliability.

As the fourth case, the attraction means according to the present invention may be so constructed as to include a rotary head being disposed rotatably about a parallel axis in parallel with the central axis, the parallel axis passing the specific rotational locus; a pair of concave holes formed so as to open in opposition to the one side of the face plate at both positions evenly spaced with respect to and across the parallel axis of the rotary head; and a pair of permanent magnets each being internally fitted and held in the respective concave hole.

In this fourth case, a pair of permanent magnets are disposed at positions across and evenly spaced with respect to the parallel axis passing the specific rotational locus, respectively. This enables the generation of the magnetic field on the specific circumference toward the other side the face plate with reliability. This, in turn, enables the movement of parts with being attracted along the specific circumference with reliability, thereby assuring that the shift in posture by the posture shift guide and sorting top faces from bases by the top-base sorting means can be conducted with more reliability.

As the fifth case, as the parts according to the present invention, the following welding nuts may be employed. That is, the welding nuts each includes a nut body having its top face and base in the form of substantially square as viewed from the top thereof, the top face and the base being disposed in parallel with each other and at a distance of a prescribed thickness dimension away from each other, and projecting portions each projecting from respective corner of the nut body on the base side, the nut body being formed integrally with the projecting portions. In this fifth case, the parts which are the objects to be sorted and aligned are specified concretely as welding nuts. The welding nuts can be aligned each in an unified posture in which the top face thereof is opposed to the face plate.

When welding nuts are employed as the objects to be sorted and aligned as in the fifth case, various kinds of concrete construction may be adopted as described below.

The radial internal space of the posture shift guide is set to a dimension corresponding to one side of the welding nut, and the internal height along the central axis of the posture shift guide is set to a dimension corresponding to the overall thickness of the welding nut. In this case, the posture shift guide can not only shift the welding nut in posture so that either the top face or base thereof is opposed to the face plate (lying posture) but also move the welding nut in the condition where one side of the substantially square welding nut faces in the tangential direction of the radial side wall of the posture shift guide. This enables the sorting the top faces from the bases by the top-base sorting means to be conducted with ease and reliability, and further permits the alignment of the welding nuts which have passed the top-base sorting means in a row in which neighboring welding nuts are arranged with both adjacent sides being opposed to each other.

At the inlet position of the posture shift guides a shift guide block may be also provided which extends diagonally relative to the face plate, and shifts the welding nuts attracted in their standing postures by the attraction means into their lying postures. Accordingly, even if the welding nut attracted by the attraction means reaches the inlet of the posture shift guide in its standing posture, the welding nut in its standing posture collides against the shift guide block to be tumbled obliquely. This causes the welding nut to be shifted into the lying posture, and enter into the posture shift guide. In this way, even if the welding nut attracted by the attraction means is in a standing posture, the welding nut can be shifted in posture by the posture shift guide, thereby implementing high efficiency in sorting and alignment.

Further, as the top-base sorting means, a regulating block is used which extends along the specific circumference and has a thickness being set smaller than the space between both adjacent projecting portions of the welding nut. The regulating block may be placed so as to have a space from the face plate larger than the thickness of the nut body itself and smaller than the overall thickness including the projecting portion in addition to the nut body. By the use of such a regulating block, the sorting of the top face from base of the welding nut can be conducted with more reliability. For examples in the welding nut attracted by the attraction means via the face plate with its top face opposite to the other side of the front and back of the face plate, the projection thickness from the face plate equals to the thickness of the nut body at the portion between both neighboring projecting portions, and hence the welding nut can pass between the regulating block and the face plate. On the other hand, in the welding nut attracted by the attraction means via the face plate with its base opposite to the other side of the face plate, each projecting portion abuts on the face plate, and hence the projection thickness from the face plate equals to the overall thickness including the projecting portion. Accordingly, the welding nut collides against the regulating block to get out of the attraction by the attraction means and flipped.

DETAILED DESCRIPTION OF THE PREFERRED EMBODIMENTS

Below, the embodiments of the present invention will be described with reference to the drawings.

Figure 1:
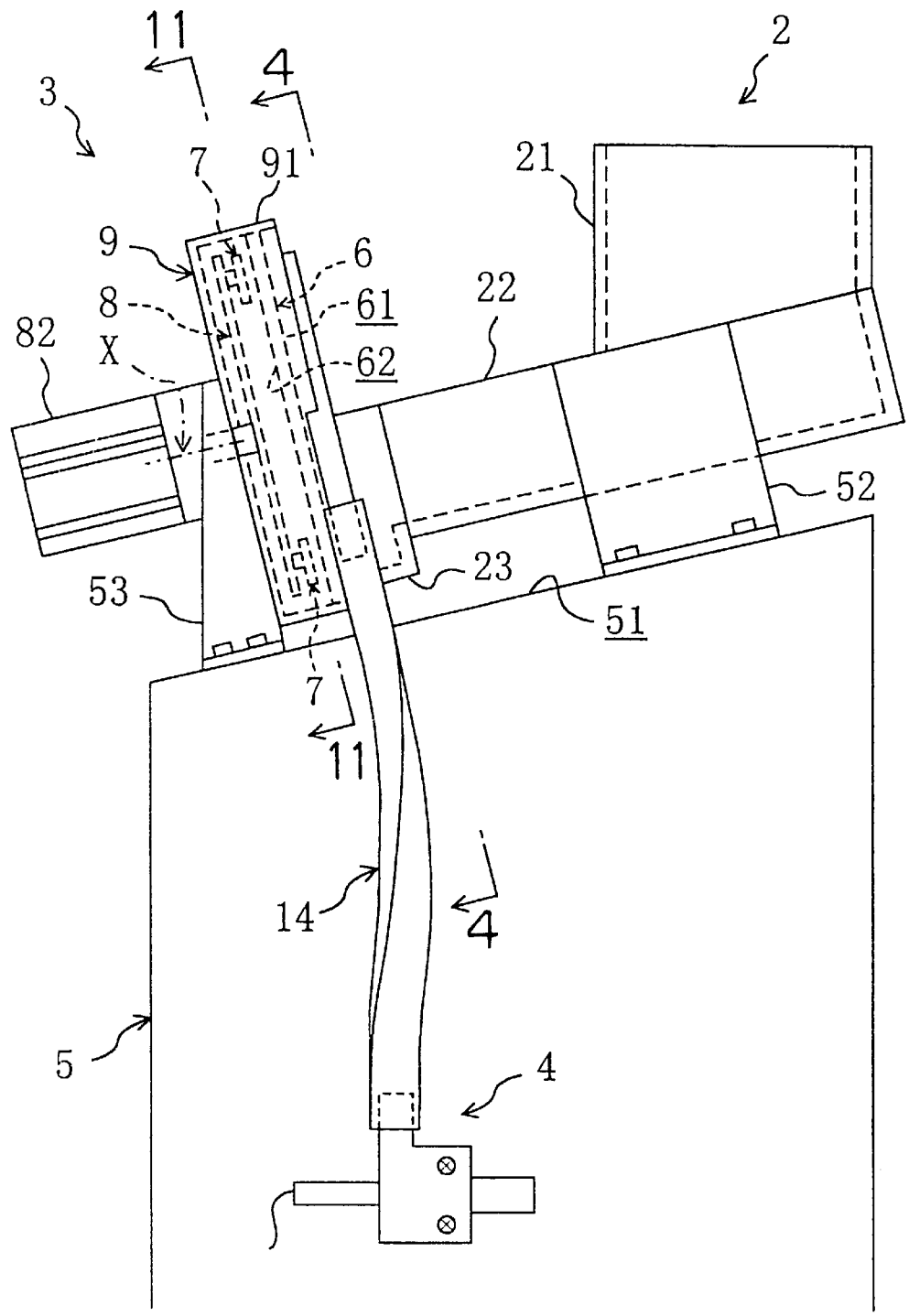
FIG. 1 is a front elevation showing an embodiment of the present invention.
Figure 2:
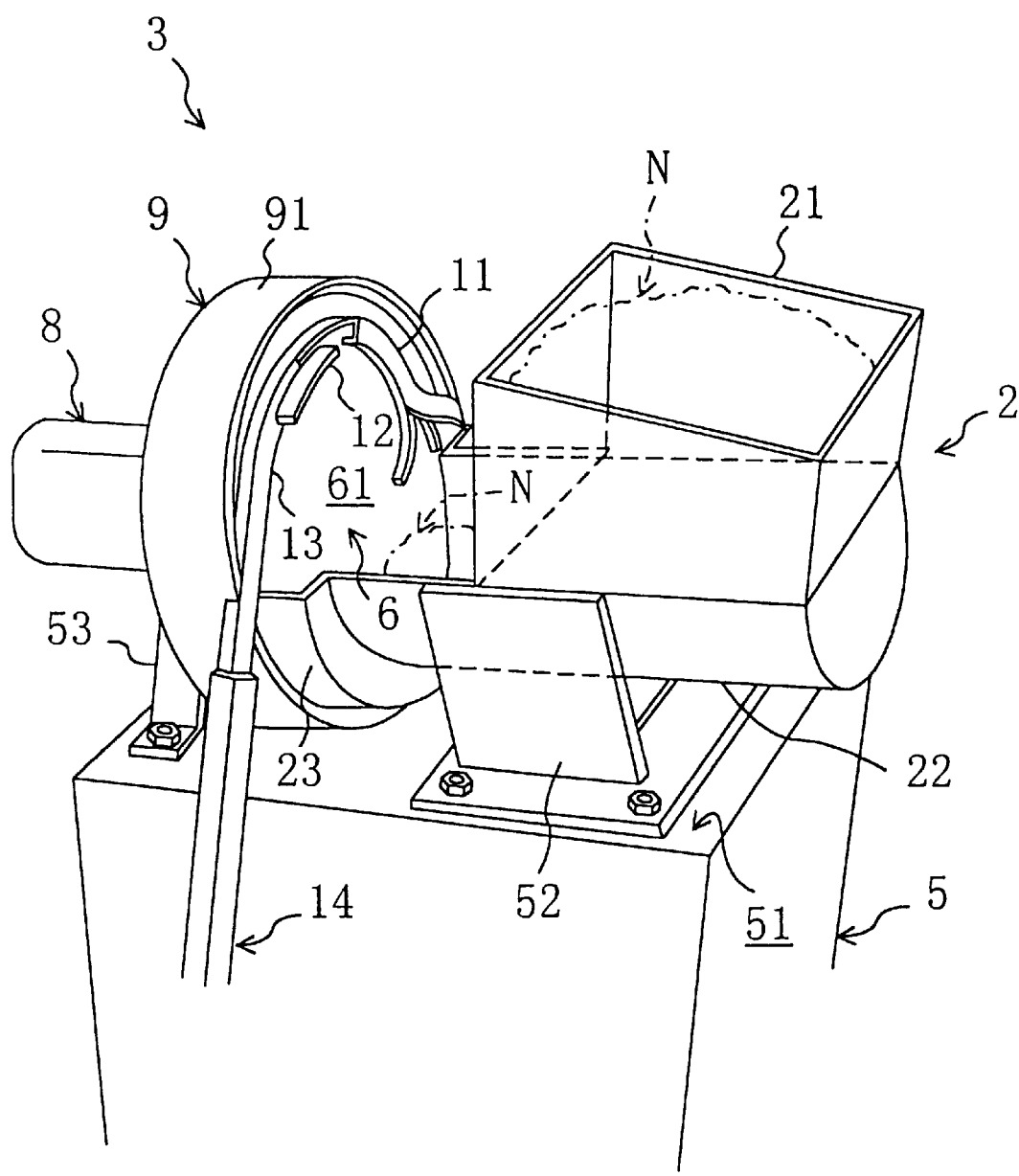
FIG. 2 is a perspective view showing the above embodiment.

Referring now to FIGS. 1 and 2, there is shown a parts alignment device whereby a welding nut is employed as a part of an object to be aligned according to an embodiment of the present invention. The reference numeral 2 denotes a charging chute in which a large number of welding nuts N in random positions are put, and 3 denotes a main body of the device for aligning the welding nuts put in the charging chute 2. The reference numeral 4 denotes a feeder for feeding welding nuts aligned by the main body 3 of the device one by one, for example, by compressed air to a nut welding equipment not shown. These are mounted on a base 5.

Figure 3:
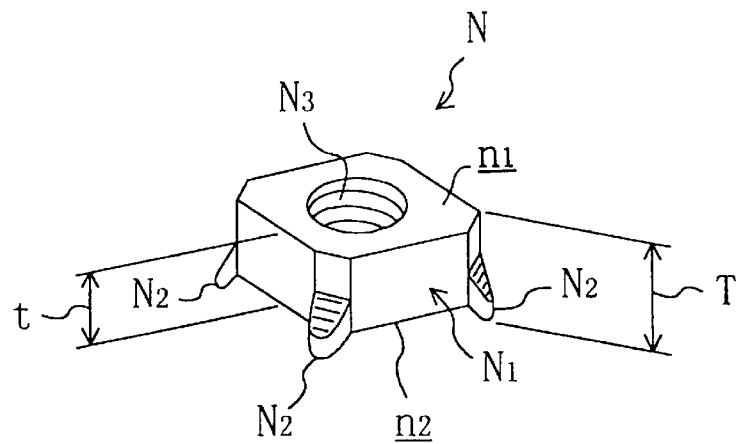
FIG. 3 is a perspective view showing a welding nut.

A description will be now given to the above welding nut N with reference to FIG. 3. The welding nut N includes a nut body N1 formed integrally with projecting portions N2. The nut body N1 has a prescribed thickness t, and has a top face n1 and a base n2 which are in parallel with each other and are formed in substantially square as viewed from the top thereof. The projecting portions N2 each projects from the corresponding corner of four corners of the nut body N1 on the side of the base n2, respectively. Accordingly, the overall thickness T of the welding nut N equals to the total dimension of the thickness t of the nut body N1 and the projection dimension of each projecting portion N2. In the same drawing, N3 represents a tapped hole penetrating through the top face and base.

Turning now more specifically to FIGS. 1 and 2, each component of the parts alignment device will be described in detail. The charging chute 2 includes a hopper tube portion 21 which opens vertically, a trough-like shoot portion 22, and a nut-storing part 23. The trough-like shoot portion 22 has a substantially half-round cross section with the upper face opening, and the proximal end thereof communicates with the opening at the bottom of the hopper tube portion 21, while the distal end thereof extends downward toward the diagonal direction. The nut-storing part 23 is formed by diametrically expanding the distal end of the trough-like shoot portion 22. The charging chute 2 is fixed to the base 5 with its top face being an inclined surface 51 by a bracket 52 at the upper position of the inclined surface 51 The nut-storing part 23 is provided with an impulse imparting means (see, FIG. 4) as mentioned below.

The main body 3 of the device includes a circular face plate 6, attraction means 7, (only shown in FIG. 1), a rotational drive means 8, and a protective cover 9. The face plate 6 extends in the direction orthogonal to the direction in which the trough-like shoot portion 22 is inclined. Each attraction means 7 is disposed on the side of a back face 62 which is one side of the face plate 6, and is moved in the same direction of rotation along a specific rotational locus R (see, FIG. 11) about the central axis X extending in the direction orthogonal to the face plate 6 to produce magnetic field on the side of a front face 61 which is the other side of the front and back of the face plate 6. The rotational drive means 8 causes the rotational movement of each attraction means 7 about the central axis X. The protective cover 9 has the shape of relatively shallow bottomed cylinder. The main body 3 of the device is fixed at the lower position of the inclined surface 51 of the base 5 by the bracket 53.

The face plate 6 is placed in a tilted position so that the front face 61 which is the other side thereof faces upward toward the diagonal direction on the charging chute 2 side and the periphery thereof is fixed to the inner circumferential surface of the cylindrical wall 91 of the protective cover 9 by means of welding or the like. The face plate 6 is formed with non-magnetic or feeble magnetic materials such as synthetic resin so as not to impede the rotational movement of each attraction means 7. In addition, the welding nut N will slide on the front face 61, and hence it is desirable that the face plate 6 is formed with materials which are non-magnetic materials such as stainless steel and excellent in abrasion resistance.

Figure 4:
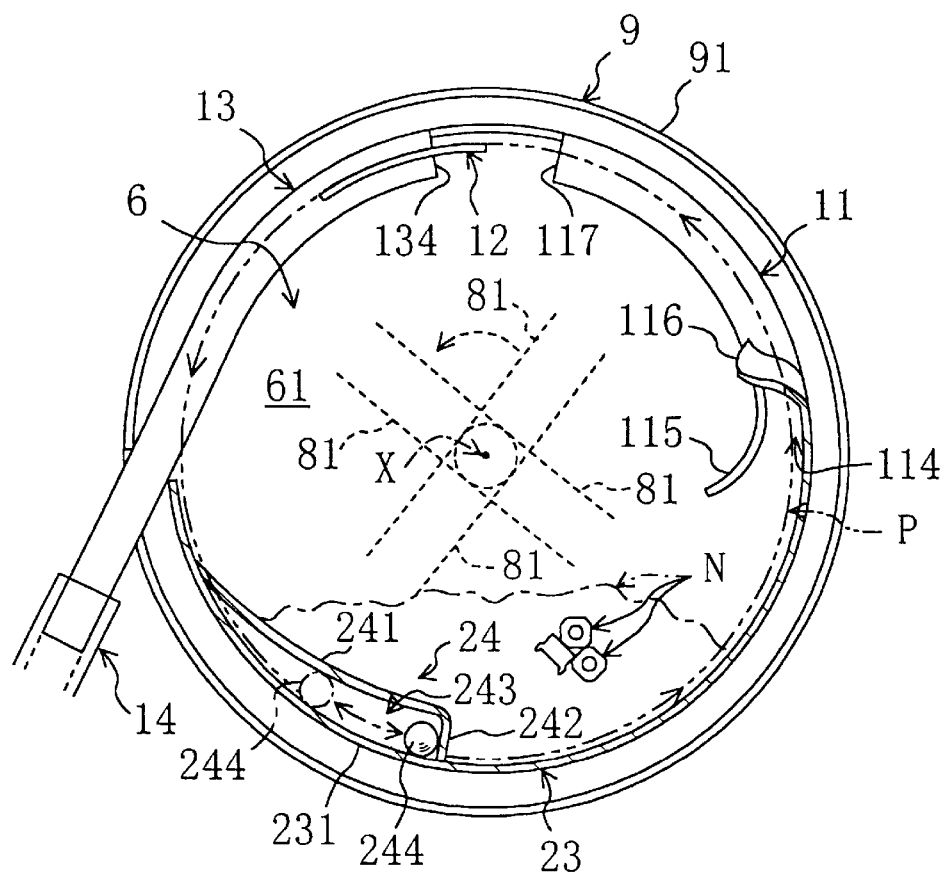
FIG. 4 is an illustrative cross-sectional view taken on line A—A of FIG. 1.

The distal end of the nut-storing part 23 is fixed to the lower half part of the front face 61 of the face plate 6 by means of welding or the like, which enables the welding nut N to be stored in the space surrounded by the lower half part of the front face 61 and the nut-storing part 23. On the other hand, in the upper half part of the front face 61 of the face plate 6, a tube-like posture shift guide 11, a regulating block 12 as a top-base sorting means, and a tube-like alignment and feed guide 13 are successively fixed in the direction of rotational movement of each attraction means 7 (counterclockwise of FIG. 4) along a circumference P having the same radius of rotation as that of the above specific rotational locus about the central axis X (hereinafter, referred to as specific circumference P) as shown in FIG. 4.

To an arcuate wall 231 which composes the nut-storing part 23, is fixed a wall 241 extending arcuately and smoothly from the backward side through the forward side of the above direction of rotational movement with a nose wall 242 being radially bent. Thus a tube-like portion 243 is formed by being defined with both the walls 231 and 241, and the front face 61 of the face plate 6. In addition, a sphere 244 formed with magnetic material such as iron is movably enclosed along the above specific circumference P in the tube-like portion 243. When the attraction means 7 approaches the sphere 244, the sphere 244 is drawn closer to the attraction means 7 in the tube-like portion 243 (see the sphere 244 of dashed line), and then, the sphere 244 moves forward together with the attraction means 7 to collide against the nose wall 242. This intermittently imparts impulse force to a large number of welding nuts N in the nut-storing part 23. An impact imparting means 24 is composed by such tube-like portion 243 and sphere 244.

The posture shift guide 11 is formed in tube of rectangular cross section with the face plate 6, an external circumferential wall 111 and an internal circumferential wall 112 both arcuately extending with the specific circumference P being interposed therebetween (see, FIGS. 5 and 6), and a lid wall 113. The internal space between the external circumferential wall 111 and internal circumferential wall 112 is set to a dimension corresponding to the length of one side of the welding nut N, while the internal space between the face plate 6 and the lid wall 113 is set to a dimension corresponding to the overall thickness T of the welding nut N. The posture shift guide 11 is provided on the side of an inlet port 114 with a first shift guide block 115 and a second shift guide block 116. The first shift guide block 115 is an end portion, of the internal circumferential wall 112, being warped so as to gradually expand the space between the internal circumferential wall 112 and external circumferential wall 111 (see, FIG. 4). The second shift guide block 116 is provided in a tilted position with respect to the face plate 6 to shift the welding nuts attracted in their standing postures into their lying postures. This second shift guide block 116 is disposed so that the internal circumferential wall 112 side thereof is far apart from the face plate 6, from which through the external circumferential wall 111 side, the second shift guide block 116 gradually approaches the face plate 6 to meet the upper end part of the external circumferential wall 111, and along the specific circumference P, the second shift guide block 116 is far apart from the face plate 6 on the backward side of the direction of rotation, from which through the forward side of the direction of rotation, it gradually approaches the face plate 6 to meet the lid wall 113.

Figure 7:
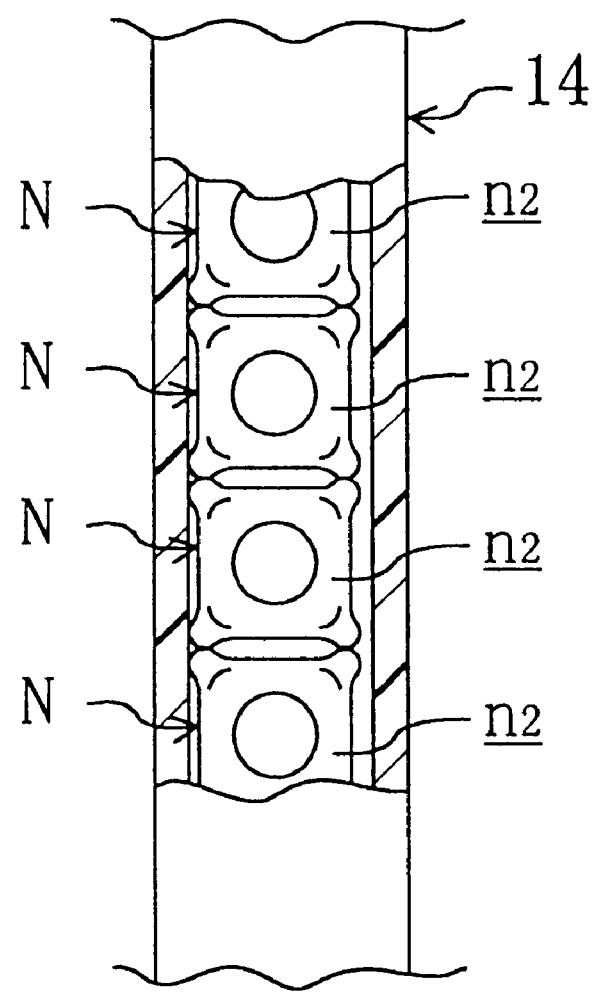
FIG. 7 is a partial cutaway elevational view on an enlarged scale showing a storage tube.

The alignment and feed guide 13 is also formed in tube of the same rectangular cross section as that of the posture shift guide 11 with the face plate 6, an external circumferential wall 131 (see, FIG. 5), an internal circumferential wall 132, and a lid wall 133. Between the inlet port 134 of the alignment and feed guide 13 and the outlet port 117 of the posture shift guide 11, is provided an external circumferential wall 120 connecting both the external circumferential walls 111 and 131. The proximal end side thereof at which the inlet port 134 is located on the backward side of the direction of rotation of the attraction means 7 is positioned along the specific circumference P, while the distal end side thereof extends tangentially of the specific circumference P to project outside of the face plate 6. To this distal end of the alignment and feed guide 13, is connected the proximal end of an alignment and feed tube 14 formed in tube of rectangular cross section with synthetic resin having flexibility such as silicone resin in communicating relationship with each other. The distal end of the alignment and feed tube 14 is connected to the feeder 4 to feed welding nuts N stored therein (See, FIG. 7) to the feeder 4.

Figure 8:
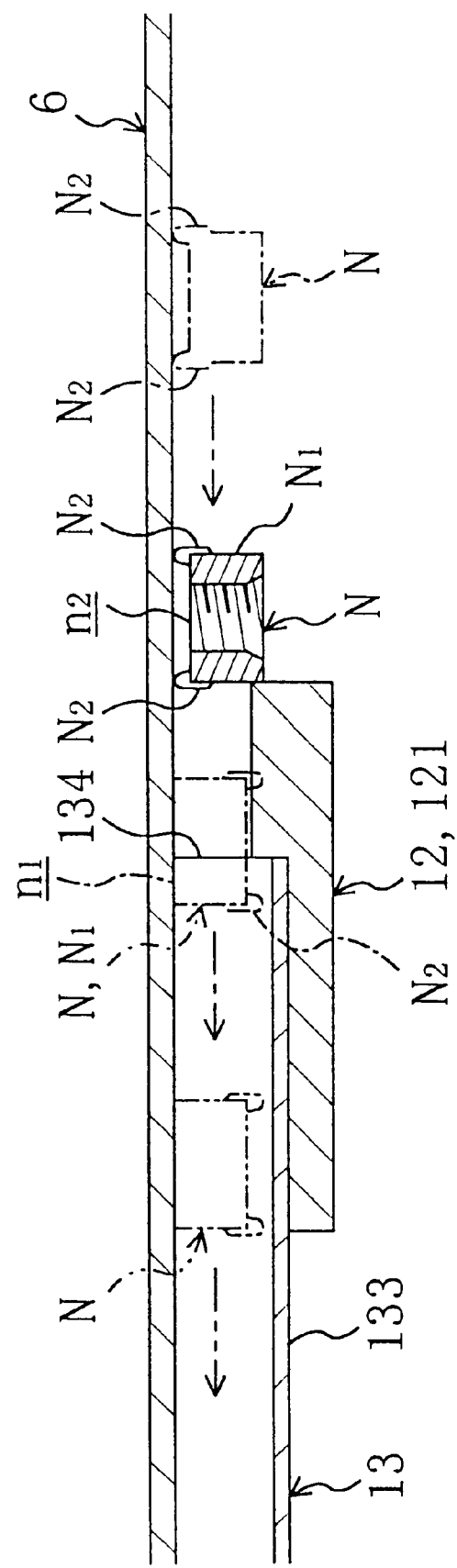
FIG. 8 is an illustrative cross-sectional view taken on line C—C of FIG. 5.

The regulating block 12 is so constructed that its proximal end is fixed to the lid wall 133 of the alignment and feed guide 13, while its distal end projects on the side of the outlet port 117 of the posture shift guide 11. The space between the projecting portion 121 and the face plate 6 is set to a dimension larger than the thickness t of the nut body N1 of the welding nut N and smaller than the overall thickness T of the welding nut N as shown in FIG. 8. In addition, the projecting portion 121 is disposed so as to pass the substantially central position of both radially adjacent projecting portions N2 of the welding nut N attracted by the attraction means 7 along the specific circumference P (see, FIGS. 5 and 9).

Figure 10:
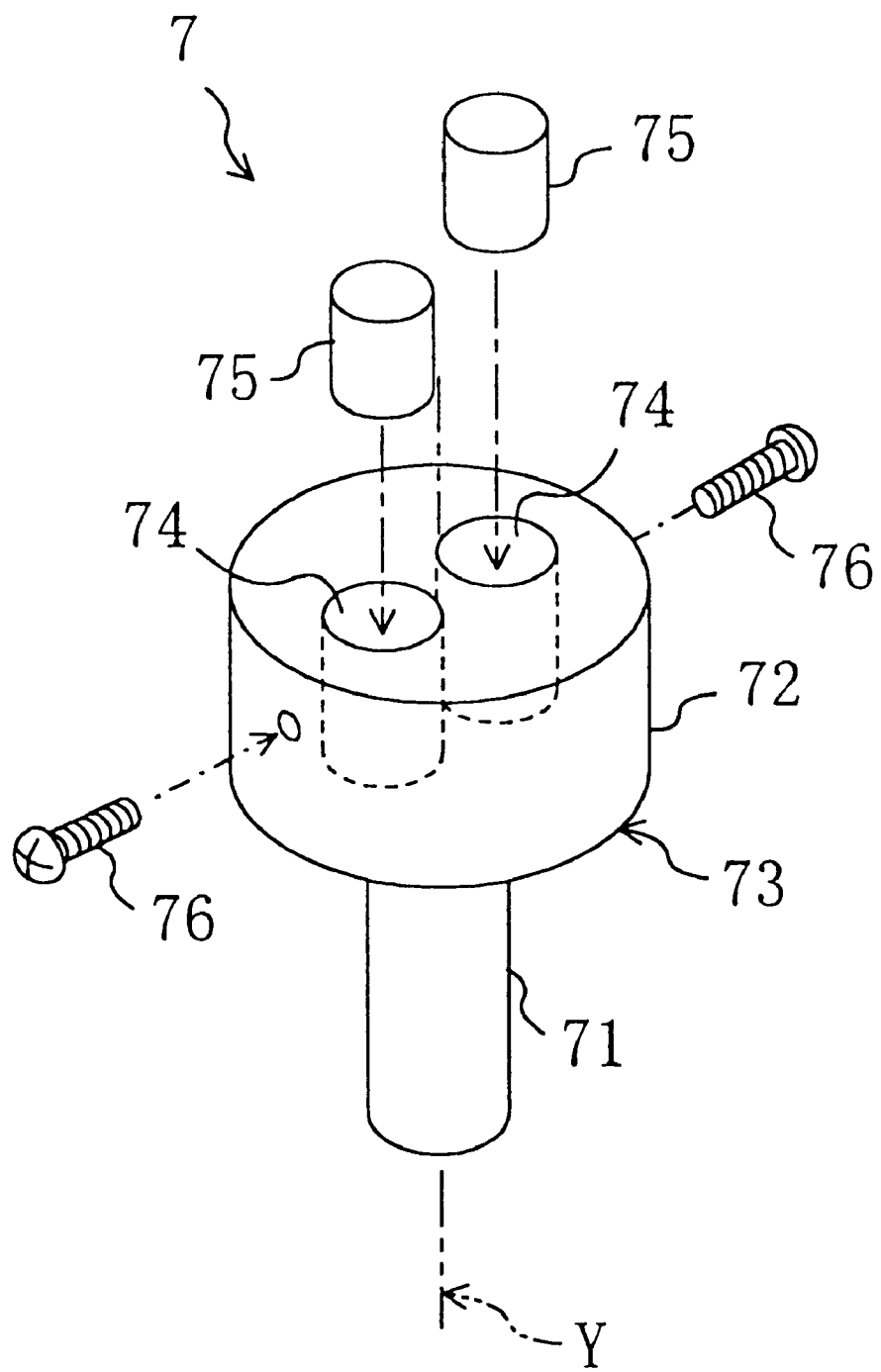
FIG. 10 is an exploded perspective view on an enlarged scale of an attraction means.

As shown in detail in FIG. 10, the attraction means 7 includes a rotary head 73 in which a head 72 with a large diameter is integrally formed at the end of a shaft 71; a pair of concave holes 74 opening at the top face of the head 72 of the rotary head 73; a pair of permanent magnets 75 each fitted inside its respective concave hole; and screws 76 each penetrating from the circumferential surface of the head 72 through its respective concave hole 74 to tighten and clamp each permanent magnet 75. Both the permanent magnets 75 are evenly spaced with respect to and across the axis passing through the central position of the rotary head 73.

Figure 11:
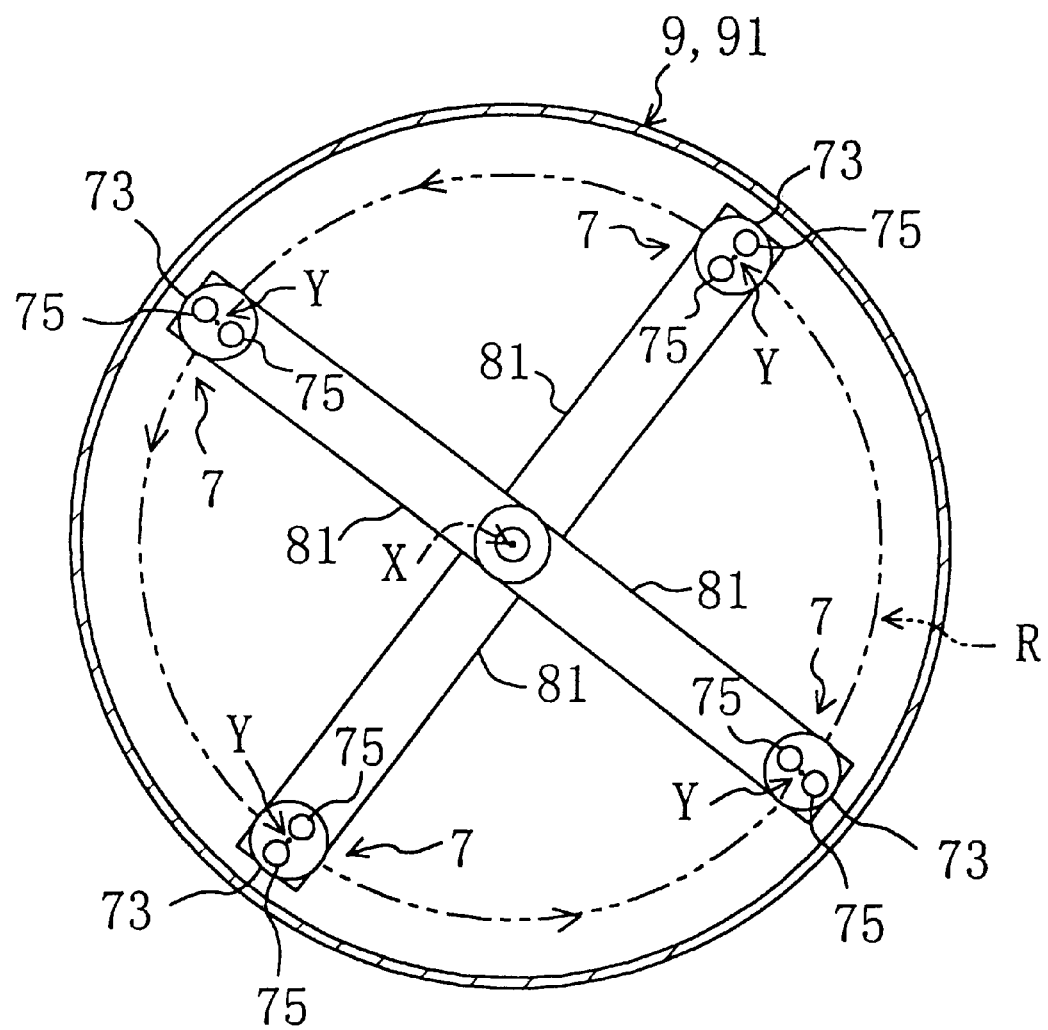
FIG. 11 is an illustrative cross-sectional view taken on line E—E of FIG. 1.

The rotational drive means 8 includes 4 arms 81 assembled crosswise about the central axis X as shown in FIG. 11, and a motor 82 (see, FIG. 1) The rotary output shaft 83 of the motor 82 (see, FIG. 6) is fixed through the proximal end position of each arm 81. The shaft 71 of the attraction means 7 is inserted through a mounting hole 811 at the distal end of each arm 81 with being externally mounted with a coiled spring 77 so that a Y axis is parallel to the central axis X, and clamped by a fixed screw 78. Thus, each attraction means 7 is disposed so that each of the Y axes passes along the specific rotational locus R (see, FIG. 11) in state where both the permanent magnets 75 are urged so as to be opposed to the back face 62 of the face plate 6 with a little clearance therebetween. This causes magnetic field centered about the specific circumference P arising from each attraction means 7 to act. The coiled spring 77 is provided for the reason as follows: even if there occurs some distortion or warpage in the face plate 6 in the manufacturing process thereof, the coiled spring 77 can follow by shrinking.

A description will now be given to the principle of alignment of the welding nuts N according to the above embodiment. First, a large number of welding nuts N are charged from the hopper tube portion 21 and shoot portion 22 of the charging chute 2 to be stored in the nut-storing part 23. When the motor 82 is actuated in this state, each attraction means 7 moves along the specific rotational locus R in accordance with the rotation of each arm 81 about the central axis X. This causes the magnetic field arising from both the permanent magnets 75 of each attraction means 7 to act on the front face 61 side across the face plate 6. This magnetic field moves along the specific circumference P in accordance with the movement of each attraction means 7. Accordingly, the welding nuts N on the specific circumference P are attracted from the inside of the nut-storing part 23 to be moved and fed toward the inlet port 114 of the posture shift guide 11 with sliding on the face plate 6.

When the attracted welding nut N is in a lying posture in which either its top face n1 or base n2 is opposed to the face plate 6, the welding nut N is corrected and shifted in posture so that one side of the welding nut N is along the external circumferential wall 111 by the first shift guide 115 and external circumferential wall 111. On the other hand, when the attracted welding nut N is in a standing posture in which its side wall is opposed to the face plate 6, the welding nut N collides against the second shift guide 116 to be tumbled. This causes a shift into the aforementioned lying posture, which is then corrected and shifted into the posture in which one side of the welding nut N is along the external circumferential wall 111 in the same manner as described above.

Figure 12:
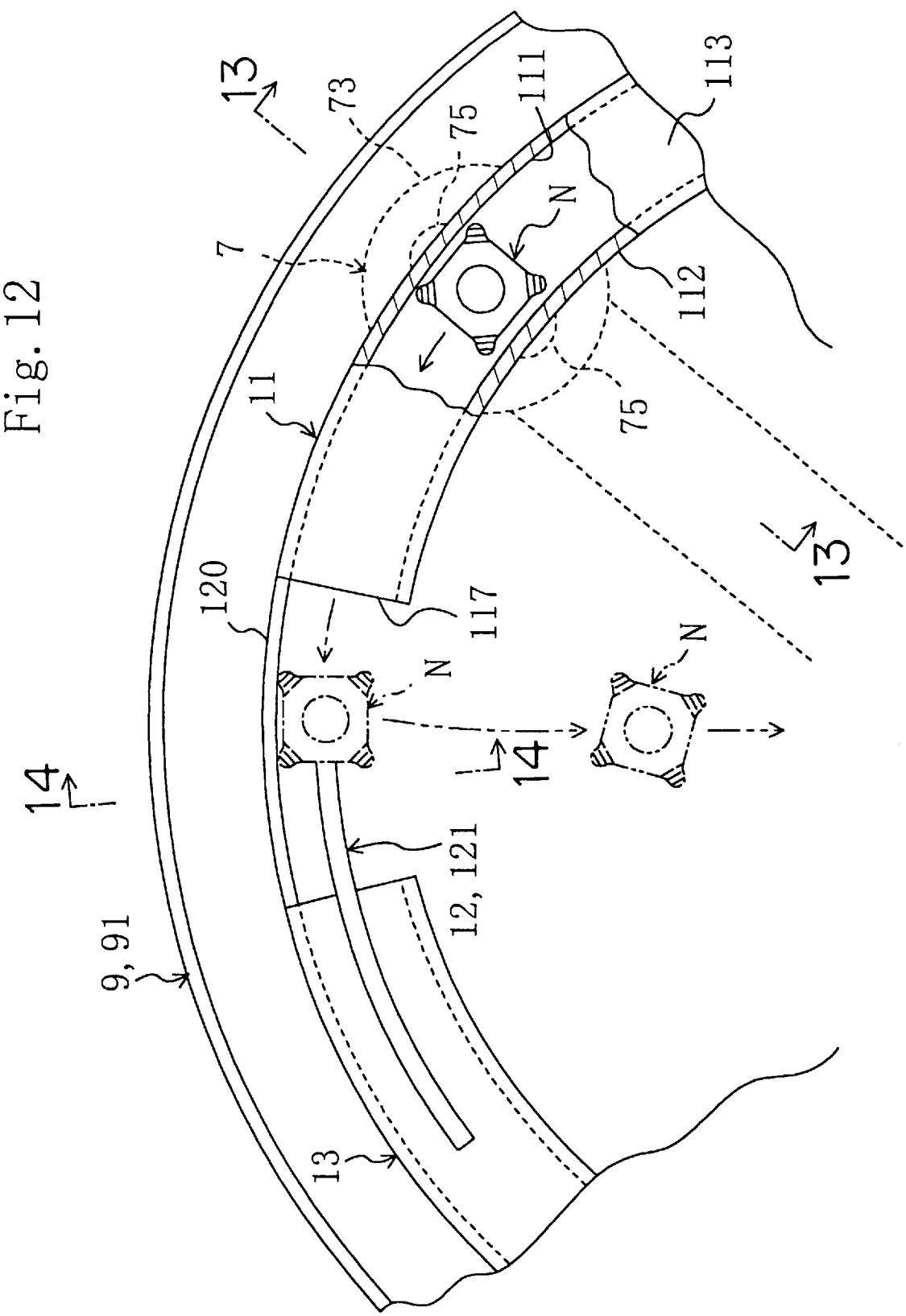
FIG. 12 is a partial cutaway view on an enlarged scale of FIG. 4, when the welding nut is in a lying posture in which its base is opposed to the face plate.
Figure 13:
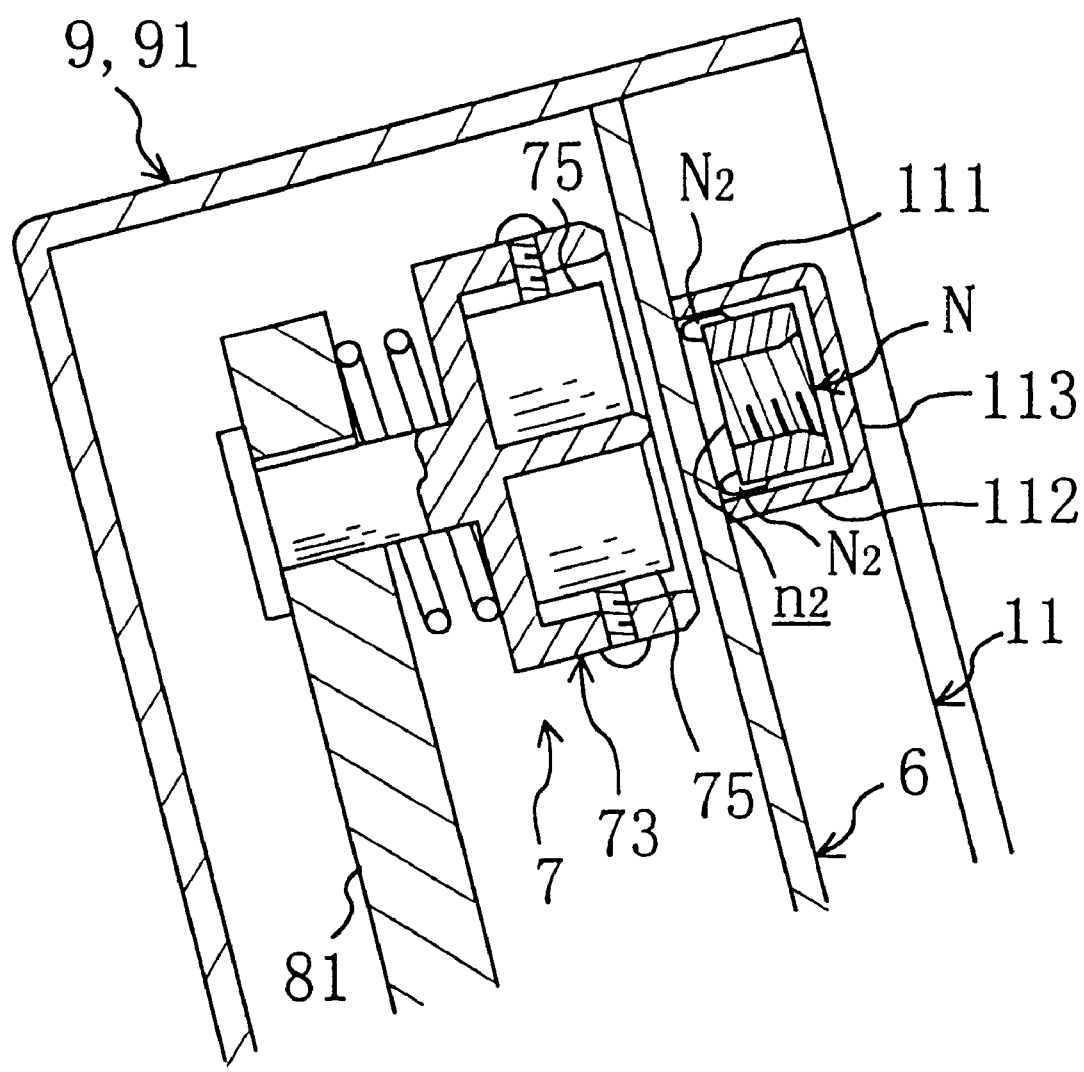
FIG. 13 is an illustrative cross-sectional view taken on line F—F of FIG. 12.
Figure 14:
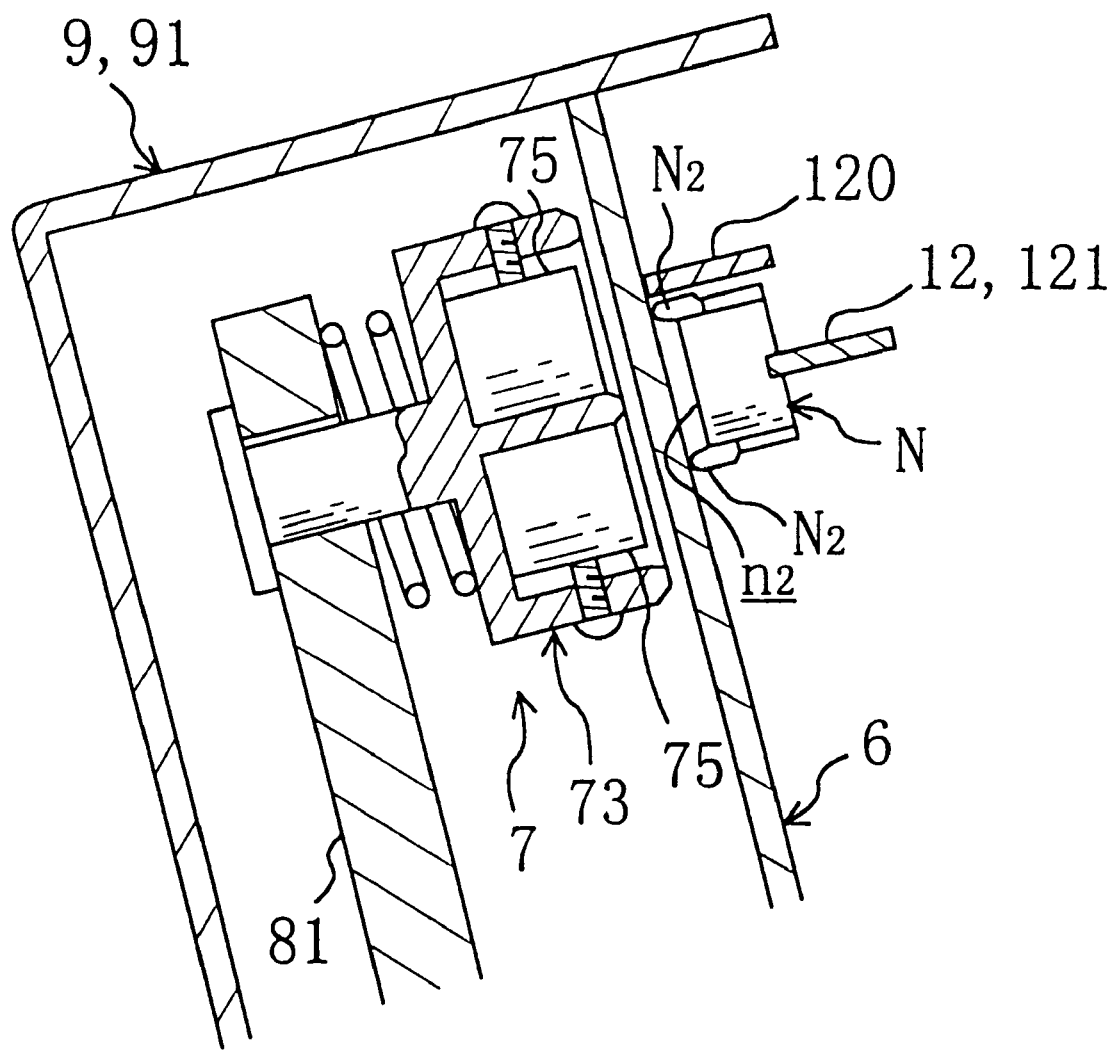
FIG. 14 is an illustrative cross-sectional view taken on line G—G of FIG. 12.

When the welding nut N in its changed posture is in a lying posture in which its base n2 is opposed to the face plate 6 as shown in FIGS. 12 and 13, it passes in the posture shift guide 11 in accordance with the movement of the attraction means 7. Then, it leaves from the outlet port 117, and collides against the projecting portion 121 of the regulating block 12 as shown in FIGS. 8 and 14. This causes the welding nut N to get out of the force of attraction due to the magnetic field of the attraction means 7 and slide down on the face plate 6 toward the nut-storing part 23 at a lower position(see, FIG. 12).

Figure 5:
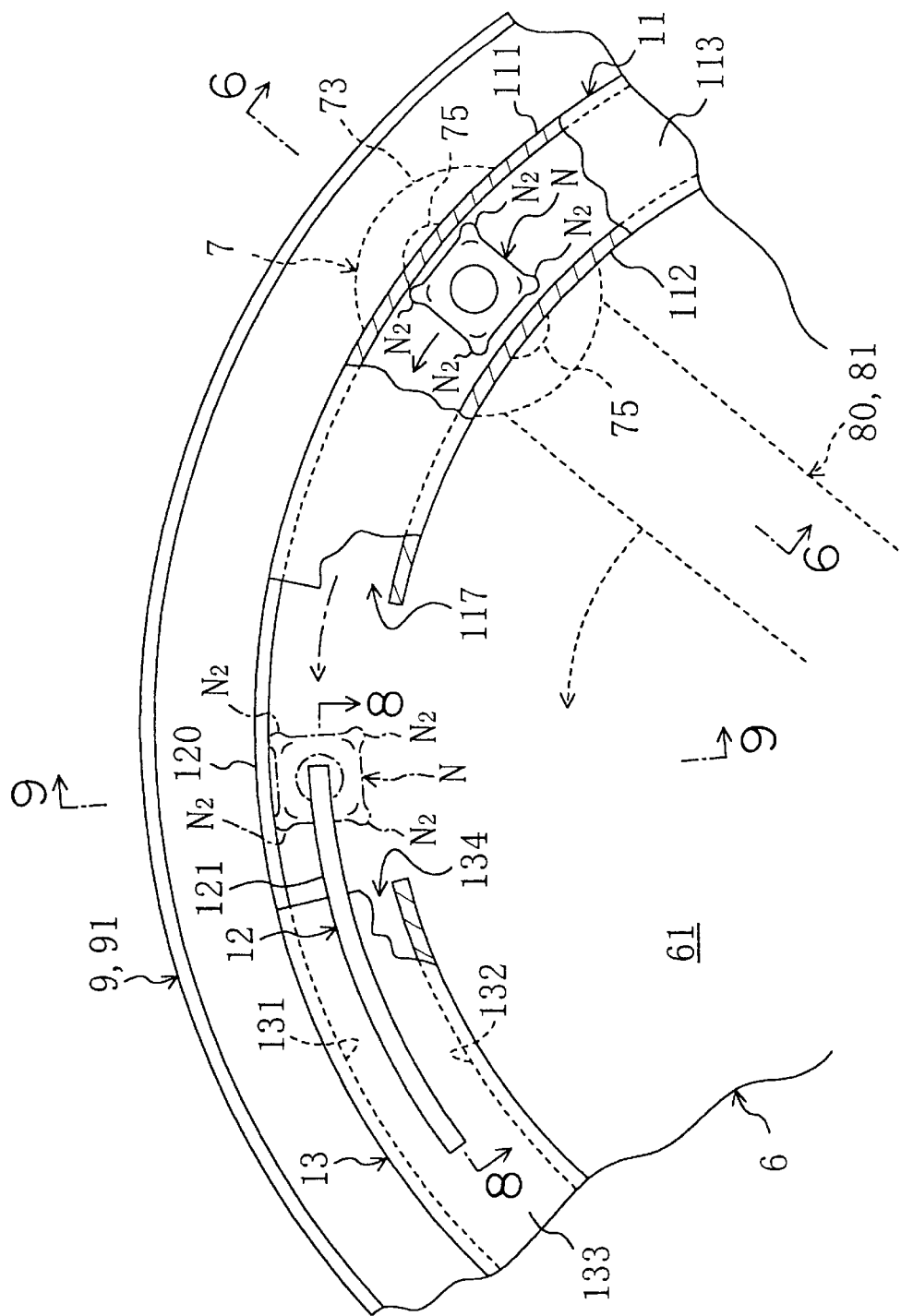
FIG. 5 is a partial cutaway view on an enlarged scale of FIG. 4, when the welding nut is in a lying posture in which its top face is opposed to a face plate.
Figure 6:
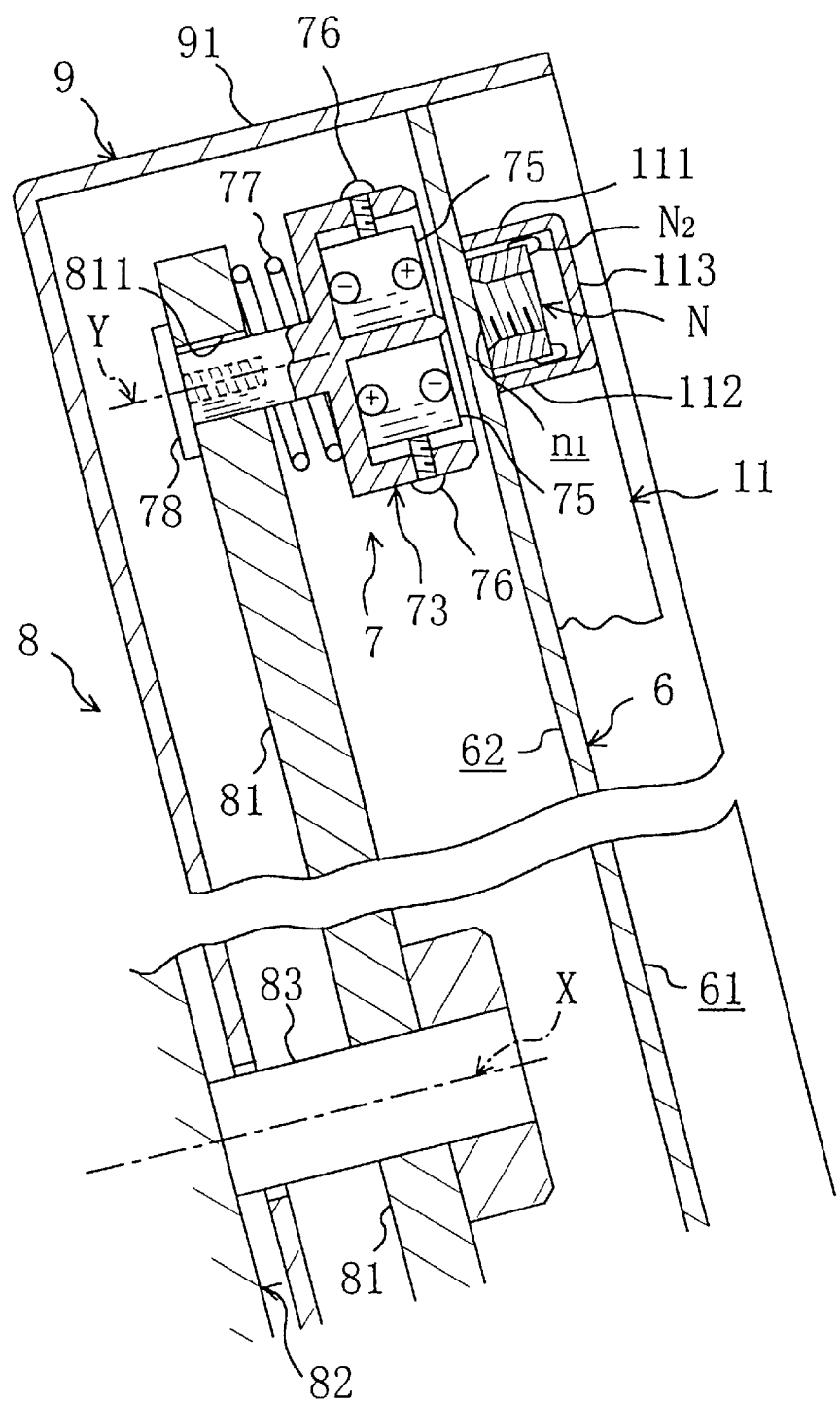
FIG. 6 is an illustrative cross-sectional view taken on line B—B of FIG. 5.
Figure 9:
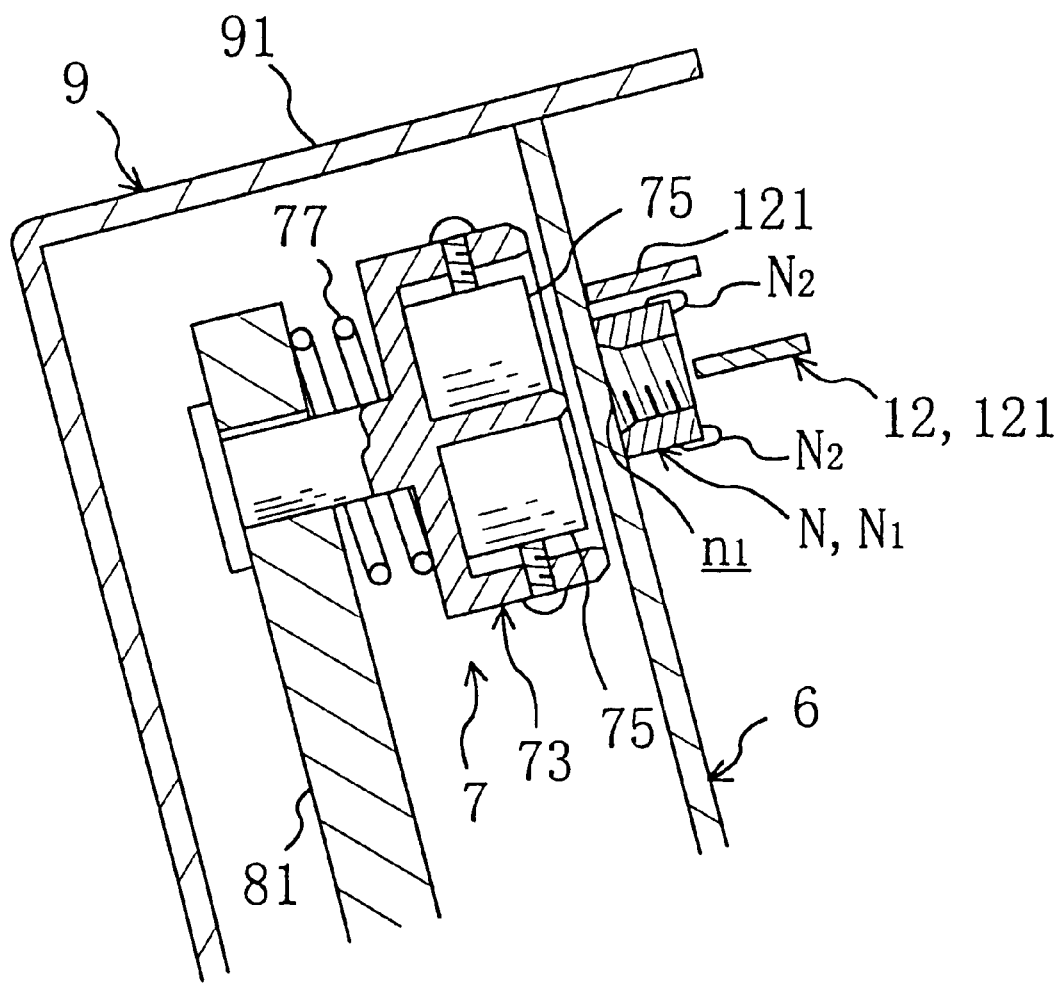
FIG. 9 is an illustrative cross-sectional view taken on line D—D of FIG. 5.

On the other hand, when the welding nut N shifted in posture by the posture shift guide 11 is in a lying posture in which its top face n1 is opposed to the face plate 6 as shown in FIGS. 5 and 6, even if it passes through in the posture shift guide 11 in accordance with the movement of the attraction means 7, and leaves from the outlet port 117, as shown in FIGS. 8 and 9, it passes the space between the projecting portion 121 of the regulating block 12 and the face plate 6 to enter into the alignment and feed guide 13. Then, the welding nut N is guided along the alignment and feed guide 13 to get out of the force of attraction due to the magnetic field of the attraction means 7, thereby being stored in the alignment and feed tube 14 in an aligned state (see, FIG. 7).

The above steps are repeated, whereby only welding nuts N in their lying posture in which the top faces n1 are opposed to the face plate 6 are sorted by the regulating block 12 to be sequentially stored in the storage tube 14 through the alignment and feed guide 13.

In repeating these steps, even if the welding nuts N in the nut-storing part 23 are likely to fall in crosslinked relationship to one another, or the like, whenever each attraction means 7 passes the tube-like portion 243 (see, FIG. 4), the sphere 244 is drawn, and then collides against the nose wall 242, repeatedly. This intermittently imparts an impulse force on the welding nuts N in the nut-storing part 23, which can prevent the occurrence of the aforementioned crosslinked relationship with reliability. This assures that the aforementioned sorting and alignment can be conducted with reliability and stability regardless of a variation in number of the welding nuts N in the nut-storing part 23.

The magnetic field arising from each of the attraction means 7 is generated by a pair of permanent magnets 75 evenly spaced with respect to and across a Y axis passing the specific circumference P This enables the welding nut N to be attracted directly above the Y axis, that is, in the condition where the welding nut N is positioned directly above the specific circumference P. This effects a shift into the lying posture by the posture shift guide 11, the correction and shift into the aligned posture in which one side of a welding nut N is opposed to the external circumferential wall 111, and the sorting of top faces from bases by the regulating block 12 with more reliability, respectively.

Other Embodiments

It is to be understood that the present invention is not intended to be limited to the above embodiments, and covers other various embodiments. According to the above embodiment, a pair of permanent magnets 75 are used as the attraction means 7, to which the present invention is not confined, one permanent magnet can be disposed directly above the Y axis. Also, as the attraction means, for example, an electromagnet may be used in place of the permanent magnet.

In the above embodiment, 4 arms 81 are used, but the present invention is not limited thereto. At least one arm may be provided, and hence at least one attraction means may be provided.

In the above embodiment, the rotation of the arm 81 causes each attraction means 7 to move along the specific rotational locus R, but the present invention is not limited thereto. For example, a rail or the like may be mounted along the specific rotational locus R to cause the attraction means to run thereon.

In the above embodiment, there is shown a case where the parts which are objects of alignment are welding nuts in the form of substantially square as viewed from the top thereof, but the present invention is not limited thereto. The present invention can be adapted for the case where the objects of alignment are welding nuts in the form of circle or hexagon as viewed from the top thereof and each having a projecting portion to be molten on welding projecting from its respective corner. The present invention is not limited to the welding nut, and can be adapted for aligning such parts that the shape, especially thickness is different between the condition where the top face is opposed to the face plate 6 and the condition where the base is opposed to the face plate 6.

In the above embodiment, the face plate 6 is disposed in a tilted position, but the present invention is not limited thereto. Parts are attracted by the magnetic field arising from the attraction means 7, and hence the face plate 6 may be disposed vertically, horizontally, or at any angles.

We claim:

1. A parts alignment device comprising:
   a face plate formed with a non-magnetic material or feeble magnetic material;
   attraction means which is provided adjacent one side of either a front or a back of said face plate, for causing a magnetic field to act toward the other side of said face plate;
   rotational drive means which is provided on the same side on which said attraction means is provided, for rotating said attraction means about a central axis orthogonal to said face plate and along a specific rotational locus;
   a tube-like posture shift guide which is provided on the other side of said face plate, for shifting each of parts attracted by said attraction means into the posture in which either of the top face or base of the part is opposed to said face plate in accordance with the rotational movement of said attraction means; and
   a top-base sorting means which is provided on the other side of said face plate, for receiving the parts each in the posture in which either of the top face or base is opposed to said face plate, and sorting the parts depending on each projection thickness of the parts from said face plate to a specific portion of the part just when the part is received from said tube-like posture shift guide, said top-base sorting means permitting the passage of each of the parts of which top face is opposed to said face plate, while flipping each of the parts of which base is opposed to said face plate against the force of attraction due to said magnetic field to prevent the passage thereof,
   wherein said posture shift guide and said top-base sorting means are disposed in this order in the direction of rotation of said attraction means and along a specific circumference corresponding to said specific rotational locus of said attraction means.

2. A parts alignment device according to claim 1, further comprising
   a storage tube for storing parts which have passed said top-base sorting means in their aligned positions.

3. A parts alignment device according to claim 1, wherein said face plate is disposed in a tilted position with said other side thereof facing diagonally upward, and
   said top-base sorting means is positioned in the neighborhood of the upper end portion of said face plate,
   said parts alignment device further comprising a parts-storing part capable of storing a plurality of parts in their nonaligned position said parts-storing part being formed in the neighborhood of the lower end portion of said other side of said face plate.

4. A parts alignment device according to claim 3, wherein said parts-storing part is provided with an impulse imparting means for intermittently imparting an impulse force on said plurality of parts, said impulse imparting means comprising a tube-like portion with one end being positioned at said parts-storing part, and the other end arcuately extending in the opposite direction of the direction of rotation of said attraction means along said specific circumference, both the ends being closed, and a sphere being formed with a magnetic material, and being movably stored along said specific circumference inside said tube-like portion.

5. A parts alignment device according to claim 1, wherein said attraction means comprises a rotary head being disposed rotatably about a parallel axis in parallel with said central axis, said parallel axis passing said specific rotational locus;

a pair of concave holes formed so as to open in opposition to said one side of said face plate at both positions evenly spaced with respect to and across said parallel axis of said rotary head; and a pair of permanent magnets each being internally fitted and held in said respective concave hole.

6. A parts alignment device according to claim 1, wherein said parts are welding nuts each including, a nut body having its top face and base in the form of substantially square as viewed from the top thereof, said top face and said base being disposed in parallel with each other and at a distance of a prescribed thickness dimension away from each other, and projecting portions each projecting from respective corner of said nut body on the base side, said nut body being formed integrally with said projecting portions.

7. A parts alignment device according to claim 6, wherein said posture shift guide has a radial internal space which is set to a dimension corresponding to one side of said welding nut, and an internal height along the central axis which is set to a dimension corresponding to the overall thickness of said welding nut.

8. A parts alignment device, according to claim 6, wherein at the inlet position of said posture shift guide, a shift guide block is provided which extends diagonally relative to said face plate, and shifts the welding nuts attracted in their standing postures by said attraction means into their lying postures in which the top faces or bases are opposed to said face plate.

9. A parts alignment device according to claim 6, wherein said top-base sorting means is composed of a regulating block being placed so as to extend along said specific circumference, have a thickness being set smaller than the space between both adjacent projecting portions of said welding nut, and have a space from said face plate which is regulated to a dimension larger than the thickness of the nut body itself and smaller than the overall thickness including the projecting portion in addition to said nut body.

* * * * *

UNITED STATES PATENT AND TRADEMARK OFFICE
CERTIFICATE OF CORRECTION

PATENT NO. : 5,913,402
DATED : June 22, 1999
INVENTOR(S) : Masaaki Miura et al.

It is certified that error appears in the above-identified patent and that said Letters Patent is hereby corrected as shown below:

```
Claim 3, line 1, after "wherein" insert --;--;
      , line 8, after "position" insert --,--.

Claim 5, line 2, after "comprises" insert --:--.
```

Signed and Sealed this

Twenty-first Day of December, 1999

Attest:

Q. TODD DICKINSON

*Attesting Officer*   *Acting Commissioner of Patents and Trademarks*